United States Patent [19]

Edmonds, Jr.

[11] 4,039,632

[45] Aug. 2, 1977

[54] PREPARATION OF BLOCK COPOLYMERS

[75] Inventor: James T. Edmonds, Jr., Bartlesville, Okla.

[73] Assignee: Phillips Petroleum Company, Bartlesville, Okla.

[21] Appl. No.: 681,978

[22] Filed: Apr. 30, 1976

Related U.S. Application Data

[62] Division of Ser. No. 709,194, Jan. 16, 1958, Pat. No. 3,970,719.

[51] Int. Cl.² .......................................... C08F 297/08
[52] U.S. Cl. ................................................ 260/878 B
[58] Field of Search .................................... 260/878 B

[56] References Cited

U.S. PATENT DOCUMENTS

| 3,318,976 | 5/1967 | Short | 260/878 B |
| 3,378,606 | 4/1968 | Kontos | 260/878 B |
| 3,529,037 | 9/1970 | Hagemeyer, Jr. et al. | 260/878 B |
| 3,702,352 | 11/1972 | Leibson | 260/878 B |
| 3,798,288 | 3/1974 | McManimie et al. | 260/878 B |
| 3,853,969 | 12/1974 | Kontos | 260/878 B |
| 3,865,902 | 2/1975 | Gordon et al. | 260/878 B |
| 3,873,642 | 3/1975 | Jezl | 260/878 B |
| 3,911,052 | 10/1975 | Castagna et al. | 260/878 B |
| 3,970,719 | 7/1976 | Edmonds, Jr. | 260/878 B |

Primary Examiner—Alan Holler

[57] ABSTRACT

Block copolymers and the processes of preparing them are disclosed wherein alpha-olefins and/or mixtures of alpha-olefins are alternately polymerized in the presence of a catalyst comprising a titanium halide and an aluminum alkyl compound.

4 Claims, No Drawings

PREPARATION OF BLOCK COPOLYMERS

This application is a division of application Ser. No. 709,194 filed Jan. 16, 1958, now U.S. Pat. No. 3,970,719 issued July 20, 1976.

This invention relates to the preparation of block copolymers. In one aspect, it relates to a process for preparing novel block copolymers of aliphatic 1-olefins.

It has recently been discovered that ethylene and other olefins can be polymerized to high molecular weight solid polymers by utilizing a catalyst system comprising an organo aluminum compound and a halide of a group IV-A metal. It has also been found that copolymers of ethylene and propylene can be prepared by a catalytic polymerization in which the catalyst employed comprises an organo aluminum compound and either titanium dichloride or titanium trichloride. In accordance with this invention, a novel method is provided for preparing block copolymers of aliphatic 1-olefins.

It is an object of this invention to provide a process for preparing novel block copolymers of aliphatic 1-olefins.

Another object of the invention is to provide a catalyst system which can be used in the preparation of block copolymers of aliphatic 1-olefins.

Other objects and advantages of the invention will become apparent upon consideration of the accompanying disclosure.

The instant invention resides in a novel catalyst and method for preparing block copolymers. The polymers prepared by the instant process are to be distinguished from copolymers in that the final polymeric product is made up of blocks or segments, each of which is substantially a homopolymer of one of the olefins employed in the process. The product of this invention can also be formed of blocks of copolymers and homopolymers as well as blocks of copolymers only. Broadly speaking, the process of this invention comprises initially contacting at least one aliphatic 1-olefin with a catalyst comprising a hydride or organo compound of aluminum, gallium, indium or thallium and a di- or trihalide of a Group IV-A metal so as to form a polymer block, and, after polymerization of substantially all of the 1-olefin, contacting the afore-mentioned catalyst in the presence of the polymer block initially formed with at least one aliphatic 1-olefin so as to form a polymer block adjacent the first-mentioned polymer block, the adjacent polymer blocks being non-identical as regards the monomer units comprising each block. It is to be understood that the instant invention is applicable to block copolymers formed of homopolymers of two different aliphatic 1-olefins as well as a block copolymer in which the individual polymer blocks are homopolymers and copolymers or copolymers only. When preparing block copolymers formed of homopolymer and copolymer blocks, one of the olefins used in preparing a copolymer block can be the same as the olefin which is contacted with the catalyst in producing a homopolymer block. In the case of block copolymers formed only of copolymer blocks, at least one of the olefins used in preparing a copolymer block is different from the olefins employed in forming an adjacent copolymer block. While the instant invention is, in general, applicable to block copolymers containing two or more individual polymer blocks, it is preferred that the products contain a total of at least four blocks.

The hydride or organo compounds used in the catalyst system of this invention correspond to the formula $MR_x$ wherein M is one of the metals aluminum, gallium, indium, or thallium, R is hydrogen, a monovalent saturated acyclic hydrocarbon radical, a monovalent saturated cyclic hydrocarbon radical, a monovalent aromatic hydrocarbon radical or any combination thereof, and wherein $x$ is equal to the valence of the metal. Examples of these compounds include $Al(C_2H_5)_3$, $Al(CH_3)_3$, $HAl(C_2H_5)_2$, $H_2AlCH_3$, $Ga(C_3H_7)_3$, $In(CH_3)_3$, $AlH_3$, $Al(C_6H_{13})_3$, $Al(CH_2(CH_2)_{18}CH_3)_3$, $Ga(C_6H_5)_3$, $In(C_6H_5)_3$, $Tl(C_2H_5)_3$ and the like. These compounds can also be used in the form of their known and stable organic complexes, such as complexes with ethers, thioethers, amines, alkali metal hydrides, alkali metal alkyls or alkali metal aryls. Examples of such complex compounds which can be used in the catalyst system of this invention are $LiAlH_4$, $NaAl(CH_3)_4$, $NaGa(C_6H_5)_4$, $NaIn(C_2H_5)_4$, and the like.

In admixture with one or more of the $MR_x$ compounds described above, the catalyst system of this invention comprises at least one group IV-A metal (Mendeleef's periodic system) di- or trihalide. The di- or trihalide of any of the group IV-A metals including titanium, zirconium, thorium and hafnium can be used. The di- and trichlorides, di- and tribromides, di- and triiodides and di- and trifluorides of the group IV-A metals can be used in the catalyst composition either individually or as mixtures. The di- and trichlorides of titanium are preferred because they have a high activity in the process of this invention.

Among the catalyst compositions falling within the scope of this invention which are preferred are the following: a mixture of titanium trichloride and triisobutylaluminum; a mixture of titanium trichloride and triethylaluminum; a mixture of titanium dichloride and triisobutylaluminum; a mixture of titanium dichloride and triethylaluminum; and a mixture of zirconium trichloride and triisobutylaluminum.

The amount of the catalyst composition which is to be used in the preparation of the block polymers of this invention can vary over a wide range. Relatively small amounts of the catalyst have been found to produce the desired activating effect. In general, the concentration of total catalyst in the reaction zone will be within the range of from about 0.01 to 10 weight percent of the diluent present in that zone. The mol ratio of the group IV-A metal dihalide or trihalide to the $MR_x$ compound is within the range of 0.01:1 to 3:1, preferably within the range of 0.05:1 to 0.5:1.

The polymerization process of this invention is carried out in the presence of a diluent which is inert and liquid under the conditions of the process. Diluents which can be used in the process include paraffins, cycloparaffins and/or aromatic hydrocarbons. Examples of suitable hydrocarbon diluents are hexane, heptane, isooctane, cyclohexane, methylcyclohexane, benzene, toluene, and the like.

The polymerization process for this invention is usually carried out at a temperature within the range of 50° to 350° F. However, it is to be understood that higher and lower temperatures can be employed without departing from the spirit and scope of the invention. It is preferred to carry out the process at a temperature in the range of 200° to 250° F. Although pressures ranging from atmospheric up to 5,000 psig can be used, a pressure in the range of 100 to 1,000 psig is ordinarily preferred. In general, the pressure used in the instant process is sufficient to maintain the reaction mixture substantially in the liquid phase.

The materials which are polymerized in accordance with this invention are aliphatic 1-olefins. It is preferred to utilize olefins containing not more than 8 carbon atoms per molecule. Examples of such olefins include ethylene, propylene, 1-butene, 1-pentene, 1-hexene and 1-octene. These alpha-olefins can be represented by the formula:

$$CH_2 = CHR$$

wherein R is selected from the group consisting of hydrogen and linear alkyl radicals containing 1 to 6 carbon atoms.

The polymerization process of this invention is conducted by initially charging the catalyst components and diluent to a suitable pressure-tight reaction zone. A 1-olefin is then charged to the reaction zone until a desired pressure therein is reached. The polymerization is allowed to proceed until substantially all of this 1-olefin has been polymerized as indicated, for example, by the drop in pressure which takes place in the reaction zone. When joining block copolymers of normally gaseous olefins in the presence of a relatively high boiling solvent, such as cyclohexane, it has been found that when the reaction zone pressure is below about 45 psig, preferably below about 40 psig, substantially all of the 1-olefins have been polymerized. At this time, the reaction zone is repressured with another 1-olefin, which is different from the 1-olefin originally charged, and the polymerization is again permitted to proceed until substantially all of this latter 1-olefin has been polymerized. This procedure then can be repeated with alternating charges of different 1-olefins, or, if desired, any number of different 1-olefins can be alternately introduced into the polymerization zone after the preceding 1-olefin has been substantially all polymerized. It is preferred to carry out the instant process so that at least 4 individual charges of monomers are used. It is necessary to either use up substantially all of each charge of 1-olefin before charging another or to remove unpolymerized monomer before the addition of another monomer. Thus, it is to be understood that it is within the scope of the invention to allow the polymerization to proceed until a portion only of one of the 1-olefins has been used up after which the remainder of this 1-olefin is removed from the reaction zone. Another 1-olefin is then added to the catalyst and polymer in the reaction zone. It is necessary to proceed in this manner in order to prevent copolymerization from taking place.

It is also within the purview of the invention to produce a block copolymer of a homopolymer of a 1-olefin with a copolymer of 1-olefins. When preparing such block copolymers, a mixture of 1-olefins is initially introduced into the reaction zone containing catalyst and diluent. After the copolymerization has been completed or unpolymerized olefins have been removed from the reaction zone, another 1-olefin, which may be one of the 1-olefins contained in the mixture originally introduced into the reaction zone, is then charged to the reaction zone. The product which is thereby produced is a block copolymer of a 1-olefin with a copolymer of 1-olefins. Polymers formed of blocks of copolymers can also be obtained by utilizing a mixture of 1-olefins for each individual charge. In preparing the latter type of block copolymers, at least one of the olefins in a charge is different from the olefins in a succeeding charge. An example of such a block copolymer is one in which the polymer chain is formed of alternating blocks of a copolymer of ethylene and propylene and a copolymer of ethylene and butene-1.

The block copolymers which are prepared in accordance with this invention can vary widely in their ratios of monomers. For example, block copolymers containing 10 percent by weight ethylene polymer and 90 percent by weight propylene polymer can be prepared. Similarly, polymers containing 90 weight percent ethylene polymer and 10 weight percent propylene polymer can be formed. As hereinbefore discussed, block copolymers of more than two polymerizable monomers can also be prepared. However, the copolymers which are preferred are those produced from two 1-olefins. A block copolymer of especially good properties is obtained by polymerizing ethylene and propylene by the process of this invention so as to form a block copolymer containing 50 percent by weight ethylene polymer and 50 percent by weight propylene polymer. The block copolymers of this invention possess excellent physical properties, particularly as regards their tensile strength and impact strength. On the other hand, it has been found that copolymers containing the same proportion of monomer units which have been prepared by the catalyst system of this invention have physical properties inferior to those of the corresponding block polymers. The preparation of copolymers by polymerizing a mixture of two olefins is to be distinguished from the instant process wherein the polymerization of a single olefin is completed prior to the introduction of the second olefin into the reaction zone.

Various materials are known to inactivate the catalyst composition of this invention. These materials include carbon dioxide, oxygen and water. It is highly desirable, therefore, that the monomers be freed of these materials, as well as other materials which tend to inactivate the catalyst. Any of the known means for removing such contaminants can be used. Furthermore, it is preferred that the diluent employed in the process be substantially free of impurities such as water, oxygen and the like. In this connection, it is desirable to remove air and moisture from the reaction vessel in which the polymerization is carried out. Although it is preferred to carry out the polymerization under anhydrous or substantially anhydrous conditions, it is to be understood that some water can be tolerated within the reaction mixture. However, the amount of water which may be tolerated is insufficient to completely deactivate the catalyst.

After the completion of the polymerization reaction, the total reaction mixture is then treated to inactivate the catalyst, as by washing with an alcohol. The alcohol-washing step is preferably carried out in a communition zone, such as a Waring Blendor, so that a finely-divided polymer is thereby provided. The polymer is then separated from the alcohol and diluent by decantation or filtration after which the polymer is dried. The diluent and alcohol can be separated, for example, by fractional distillation, and reused in the process.

A more comprehensive understanding of the invention can be obtained by referring to the following illustrative examples which are not intended, however, to be unduly limitative of the invention.

EXAMPLE I

In this run, a block copolymer of ethylene and propylene was prepared in accordance with the process of this invention. Fifteen-hundred milliliters of cyclohexane were charged to a 1-gallon stainless steel autoclave which was equipped with a stirrer and a jacket for circulating heating or cooling fluid. Prior to introduction, the cyclohexane was purified by hydrogenation followed by drying over silica-alumina and bubbling with prepurified nitrogen. Forty-five milliliters of a solution of triisobutylaluminum in cyclohexane, which contained 0.19 grams to a milliliter, and 1.2 grams of titanium trichloride were charged to the autoclave.

The titanium trichloride was prepared by charging two grams of aluminum powder and 44.4 grams of titanium tetrachloride to a glass tube, flushing the glass tube with nitrogen, sealing the tube, and raising its temperature to between 400° and 435° F. for 18 hours. The resulting product was a purple powder which was then transferred to another glass tube and maintained at a temperature between 400° and 500° F. for 18 hours under a vacuum. The product of this latter heating step was the titanium trichloride which was used as one of the components in the above-described catalyst system.

After charging of the catalyst components, the autoclave was flushed with nitrogen and heated to 220° F. After the nitrogen had been bled off, the autoclave was alternately charged with ethylene and propylene. The ethylene and propylene were charged from cylinders which were mounted on balances, both streams being passed through a dry tube of activated silica-alumina before passing into the autoclave. Because of the weighing procedure, the amounts of monomers charged to the autoclave are only approximate amounts. After an initial ethylene charge of 60 grams, the pressure within the autoclave was 150 psig. Ten minutes later when the pressure had fallen to 60 psig, an additional 40 grams of ethylene were charged to the autoclave, by raising the pressure to 150 psig. Forty minutes later, the pressure had fallen to 30 psig, indicating that substantially all of the ethylene had been polymerized. The pressure was then raised to 100 psig by pressuring 50 grams of propylene into the autoclave. During the next hour and 15 minutes, 50 more grams of propylene were charged to the autoclave. After 2 more hours, the pressure had dropped to 35 psig, indicating that substantially all of the propylene had been polymerized. At this time 50 grams of ethylene were charged to the autoclave, raising the pressure therein to 180 psig. During the next 40 minutes, 50 grams of ethylene were charged, and at the end of this period the pressure had again dropped, indicating that substantially all of the ethylene had been polymerized. During the next 40 minutes, 100 additional grams of propylene were charged to the reactor. The temperature during the polymerization was maintained between 200° and 230° F. After the last charge of propylene, the polymerization was allowed to proceed for 15 minutes at which time the pressure in the autoclave was 90 psig. The reaction was then terminated by circulating cooling water through the jacket of the autoclave. Thirteen hours later, the temperature in the autoclave was 90° F. and the pressure was 20 psig. A heating medium was then circulated through the autoclave jacket, and after 25 minutes the temperature and pressure in the autoclave were 180° F. and 35 psig, respectively. The stirrer was then turned on. After 75 minutes, the stirrer was turned off, and cooling water was circulated through the jacket. After the unreacted olefin was vented, the autoclave was then opened. The solid polymer which was present in the autoclave was removed and washed in a Waring Blendor with one liter of methyl alcohol. The washed polymer was then dried overnight in a vacuum oven at 60° C. About 445 grams of dry polymer was obtained. This polymer was evaluated for physical properties as shown in the table at the end of Example IV.

EXAMPLE II

In this run, ethylene and propylene were copolymerized in an autoclave under the same conditions as those set forth in Example I. Fifteen-hundred milliliters of purified cyclohexane, 45 milliliters of the triisobutylaluminum solution, and 1.2 grams of titanium trichloride were charged to the autoclave. The materials and amounts of materials used in this example are identical to those employed in Example I. After flushing the autoclave with nitrogen, the stirrer was turned on, and the reactor contents were heated to 220° F. by means of a heating medium circulated through the reactor jacket. After venting the nitrogen from the autoclave, ethylene and propylene were charged to the reactor through the same apparatus employed in Example I. Because of the apparatus used, there was a time interval between the charging of the propylene and the charging of the ethylene. However, this interval was small, e.g., 2 or 3 minutes, so that a mixture of the monomers was present in the reactor at all times. The initial monomer charge was 25 grams of propylene, which elevated the pressure to 55 psig. Two minutes later, 25 grams of ethylene were charged, raising the pressure to 120 psig. After 13 minutes, the pressure in the autoclave had dropped to 40 pounds, and at this time 25 grams of propylene were charged to the reactor. Three minutes later, 25 grams of ethylene were added to the autoclave. In another 12 minutes, 25 grams of propylene were pressured into the autoclave, and after an additional 3 minutes 25 grams of ethylene were charged. Seventeen minutes later, 25 grams of propylene were charged and 2 minutes later 25 grams of ethylene were charged. After another 18 minute interval, 25 grams of propylene were pressured into the autoclave, followed 2 minutes later by the charging of 25 additional grams of ethylene. After 28 more minutes, 25 grams of propylene were charged and 2 minutes later, 25 more grams of ethylene were added to the autoclave. Thirty-three minutes later, 25 grams of propylene were charged, and 3 minutes later, an additional 25 grams of ethylene were charged. The reaction was allowed to continue for 57 minutes, at which time 25 grams of propylene were charged. This was followed 3 minutes later by the charging of 25 grams of ethylene. Sixty-two minutes later, the reaction was stopped by circulating a cooling medium through the jacket of the autoclave. During the entire course of the reaction, the temperature in the autoclave was maintained at about 220° F. The maximum pressure reached during the run was 215 psig while the total reaction time was 90 minutes. At the end of the reaction, excess monomer was vented from the autoclave which was then opened. The solid polymer present in the autoclave was washed in a Waring Blendor with one liter of methyl alcohol after which it was dried for 60 hours in a vacuum oven at 70° C. The yield of dry polymer was about 414 grams. The physical properties of this polymer were determined as shown in the table at the end of Example IV.

EXAMPLE III

In this run, a block copolymer of polypropylene with a copolymer of ethylene and propylene was prepared. Fifteen-hundred milliliters of purified cyclohexane were charged to the autoclave of Example I. Forty-five milliliters of a solution of triisobutylaluminum and cyclohexane, which contained 0.29 grams per milliliter, and 1.2 grams of titanium trichloride, prepared as described in Example I, were then charged to the autoclave. After flushing with prepurified nitrogen, the autoclave contents were heated to 230° F by circulating a heating medium through the jacket. The nitrogen was then bled off, and the monomers were charged as described hereinafter. The initial charge was 50 grams of propylene, which raised the autoclave pressure to 90 psig. After 30 minutes, 25 grams of propylene were charged, followed two minutes later by a charge of 25 grams of ethylene. After the pressure had dropped to 40 pounds, which was 43 minutes later, 50 grams of propylene were charged to the autoclave, raising the pressure to 120 psig. Forty minutes later, the pressure had dropped to 40 pounds, and 25 grams of propylene were then introduced, followed two minutes later by a 25-gram charge of ethylene. This charging procedure raised the pressure to 150 psig. After an additional 23 minutes, the pressure had fallen to 35 pounds, and 50 grams of propylene were then charged, raising the pressure to 115 psig. Eighty-five minutes later, the pressure had fallen to 40 pounds, and 25 grams of propylene were charged, followed 2 minutes later by a charge of 25 grams of ethylene. This raised the pressure in the autoclave to 200 psig. After an additional 78 minutes, the pressure had fallen to 45 pounds at which time 50 grams of propylene were charged. After 1 hours, the pressure had dropped to 50 pounds from a value of 115 psig, and 25 grams of propylene were then charged, followed 2 minutes later by a 25-gram charge of ethylene. Twenty-three minutes later the pressure had dropped to 50 pounds at which time the reaction was stopped by circulating cooling water through the jacket. The autoclave was allowed to cool overnight after which it was opened and the polymer was removed. The polymer was washed in a Waring Blendor with 1 liter of methyl alcohol, after which it was dried overnight in a vacuum oven at 65° C. Approximately 470 grams of dry polymer was obtained. The properties of this polymer are set forth hereinbelow in the table following Example IV.

EXAMPLE IV

In this run, it was attempted to prepare a block copolymer of ethylene and propylene employing a catalyst system consisting of titanium tetrachloride and triisobutylaluminum. Fifteen-hundred milliliters of prepurified cyclohexane were charged to the autoclave of Example I, followed by charges of 1.15 milliliters (1.99 grams) of titanium tetrachloride at 3.45 grams of triisobutylaluminum. The autoclave was then closed and flushed with prepurified nitrogen. The autoclave temperature was then raised to 170° F. by circulating a heating medium through the jacket. Fifty grams of propylene were then charged to the reactor, raising the pressure to 70 psig. One hour later, the pressure in the reactor was reduced to 10 psig by venting unreacted propylene. Two minutes later, the pressure was raised to 150 psig by charging 50 grams of ethylene. After 90 minutes, the pressure had fallen to 10 pounds, and 50 grams of propylene were charged raising the pressure to 90 psig. Fifty minutes later, the pressure had fallen to 15 pounds, and 50 grams of ethylene were then charged, raising the pressure to 175 psig. One hundred-fifty minutes later, a 50 gram charge of propylene was used to raise the pressure from 10 to 100 psig. Eighty minutes later, a 50 gram charge of ethylene was employed to raise the pressure from 20 to 250 psig. Thirty-five minutes later, the pressure had fallen to 10 psig, and the reaction was stopped by circulating cooling water through the jacket. During the course of the reaction, the temperature was maintained between 150° and 170° F. while the maximum pressure during the run was 250 psig. Upon completion of this polymerization, the reactor was allowed to cool and then opened. About 1 liter of isopropyl alcohol was then added to the reactor. The reactor contents were allowed to stand overnight after which the polymer was removed and washed twice in a Waring Blendor, using one liter of isopropyl alcohol in each wash. The polymer was then dried overnight under vacuum at 65° C., giving a yield of polymer of about 317 grams. The properties of this polymer are set forth hereinbelow in the table.

TABLE

| | PHYSICAL PROPERTIES OF POLYMERS FROM | |
|---|---|---|
| | Example I | Example II |
| Ash, Wt. % | 0.38 | 0.61 |
| Inherent Viscosity[1] | 3.441 | 1.956 |
| Melt Index[2] | 0.446 | 3.066 |
| Density, gm/cc at room temperature | 0.916 | 0.875 |
| Crystalline Freeze Point, ° F.[3] | 245 | * |
| Impact Strength, Foot Pounds/Inch Notch[4] | 3.58 | * |
| Stiffness, psi | 84,000 | * |
| Hardness, Shore D | 64 | 24 |
| Tensile Strength, At Yield, Compression Molded, psi[5] | 2048 | * |
| Tensile Strength, At Yield, Injection Molded, psi[6] | 3170 | * |
| Tensile Strength, At Break, Compression Molded, psi[5] | Not Determined | 194 |
| Tensile Strength, At Break, Injection Molded, psi[6] | Not Determined | * |
| Elongation, %, At Break, Compression Molded[5] | 5 | 820 |
| Elongation, %, At Break, Injection Molded[6] | 26 | * |
| Heat Distortion Temperature, ° F.[7] | 112 | * |
| Flex Temperature, ° F.[8] | +21 | * |
| Zero Strength Temperature, ° F.[9] | 308 | 80 |
| | PHYSICAL PROPERTIES OF POLYMERS FROM | |
| | Example III | Example IV |
| Ash, Wt. % | 0.39 | 0.054 |
| Inherent Viscosity[1] | 1.848 | Not Determined |
| Melt Index[2] | 2.212 | 4.994 |
| Density, gm/cc at room temperature | 0.891 | 0.877 |
| Crystalline Freeze Point, ° F.[3] | No Plateau | Not Determined |
| Impact Strength, Foot Pounds/Inch Notch[4] | 8.37 | * |
| Stiffness, psi | 25,000 | * |

TABLE-continued

| | | |
|---|---|---|
| Hardness, Shore D | 44 | 17 |
| Tensile Strength, At Yield, Compression Molded, psi[5] | 1,297 | Not Determined |
| Tensile Strength, At Yield, Injection Molded, psi[6] | No Yield | Not Determined |
| Tensile Strength, At Break, Compression Molded, psi[5] | 1,297 | 207 |
| Tensile Strength, At Break, Injection Molded, psi[6] | 1,900 | 226 |
| Elongation, %, At Break, Compression Molded[5] | 30 | 188 |
| Elongation, %, At Break, Injection Molded[6] | 120 | 135 |
| Heat Distortion Temperature, °F[7] | 95 | * |
| Flex Temperature, °F.[8] | −28 | −62 |
| Zero Strength Temperature, °F.[9] | 273 | 150 |

*Polymer sample too soft for test.
[1]Inherent Viscosity measured on a solution of 0.2 gram of polymer in 50 cc of tetralin at 130° C.
[2]ASTM D1238-52T
[3]Obtained by melting polymer sample, inserting thermocouple in molten polymer, and allowing to cool slowly. Temperature is plotted on a temperature v. time chart, and crystalline freeze point is the first plateau in this curve.
[4]ASTM D256-47T
[5]ASTM D412-51T
[6]ASTM D638-52T
[7]ASTM D648-45T
[8]Determined by method of Clash and Berg, Industrial & Engineering Chemistry, 34, 1218 (1942); recorded as temperature at which modulus in torsion is 135,000 psi.
[9]Determined by method of Islyn Thomas, "Injection Molding of Plastics, P. 504, Reinhold Publishing Co. (1947).

Referring to the above table, the polymers of Examples I and III were prepared in accordance with the process of this invention while the polymers of Examples II and IV were prepared by other processes and can be considered as control runs. The polymer of Example II was a copolymer, and the data indicate that this polymer was inferior to the block copolymer of Example I. The polymer of Example III is a block copolymer of polypropylene with an ethylene-propylene copolymer. Example IV illustrates that a catalyst system employing titanium tetrachloride as one of the catalyst components is not effective in producing a polymer having the superior physical properties of the block polymers of this invention. Thus, the data in the above table show that in Example IV a polymer was produced which was too soft to determine its stiffness, hardness, or heat distortion temperature and which had a low tensile strength and zero strength temperature as compared to the products of this invention.

The block copolymers produced in accordance with this invention have utility and applications where solid plastics are used. They can be molded to form articles of any desired shape, such as bottles and other containers for liquids. Also, they can be formed into pipe or tubes by extrusion.

As will be evident to those skilled in the art, many variations and modifications of the invention can be practiced upon consideration of the foregoing disclosure. Such modifications and variations are believed to be clearly within the spirit and scope of the instant invention.

I claim:

1. A block copolymer comprising first and second adjacent polymer blocks, each of which is formed from one alpha-olefin having the formula:

$$CH_2 = CHR$$

wherein R is selected from the group consisting of hydrogen and linear alkyl radicals containing 1 to 6 carbon atoms, said polymer blocks being non-identical with respect to the alpha-olefins forming said blocks.

2. A block copolymer according to claim 1 comprising a first polymer block of a homopolymer of ethylene and adjacent thereto a second polymer block of a homopolymer of propylene.

3. A block copolymer comprising first and second adjacent polymer blocks, each of which is formed from at least two alpha-olefins having the formula:

$$CH_2 = CHR$$

wherein R is selected from the group consisting of hydrogen and linear alkyl radicals containing 1 to 6 carbon atoms, said polymer blocks being non-identical with respect to the alpha-olefins forming said blocks.

4. A block copolymer according to claim 3 comprising a first polymer block of a copolymer of ethylene and propylene and adjacent thereto a second polymer block of a copolymer of ethylene and butene-1.

* * * * *